March 15, 1955  E. F. RIESING  2,704,045
PRESSURE INDICATING DEVICE
Filed Jan. 9, 1953  2 Sheets-Sheet 1

INVENTOR.
ELLWOOD F. RIESING
BY
Willets Hardman
ATTORNEYS

March 15, 1955  E. F. RIESING  2,704,045
PRESSURE INDICATING DEVICE
Filed Jan. 9, 1953  2 Sheets-Sheet 2

INVENTOR.
ELLWOOD F. RIESING
BY
*Willets Hardman & Kehr*
ATTORNEYS 2,704,045

PRESSURE INDICATING DEVICE

Ellwood F. Riesing, Dayton, Ohio, assignor to General Motors Corporation, Detroit, Mich., a corporation of Delaware Application January 9, 1953, Serial No. 330,426

5 Claims. (Cl. 116—34)

This invention relates to a pressure indicating device and more particularly to a device adapted to be associated with a pneumatic tire to indicate a predetermined pressure therein.

It is an object of the present invention to provide a device adapted to be used in permanent detachable connection with a pneumatic tire which will visually indicate the pressure within the tire.

It is a further object of the present invention to provide a device adapted to be attached to the valve stem of a pneumatic tire during the normal use thereof which will visually indicate a range of pressure therein and permit inflating of the tire through the device without the removal thereof from the tire.

A more specific object of the present invention is to provide an indicating device having a transparent case sealingly connected to a valve stem of a pneumatic tube and having an indicating means therein biased against a predetermined pressure, and means whereby the tire may be inflated or deflated without disconnecting said device from the valve stem.

In connection with the above objects it is another object to include emergency means within the device for sealing the tire against loss of pressure in the event of failure of the indicating device.

Further objects and advantages of the present invention will be apparent from the following description reference being had to the accompanying drawings wherein a preferred embodiment of the present invention is clearly shown.

Figure 1:
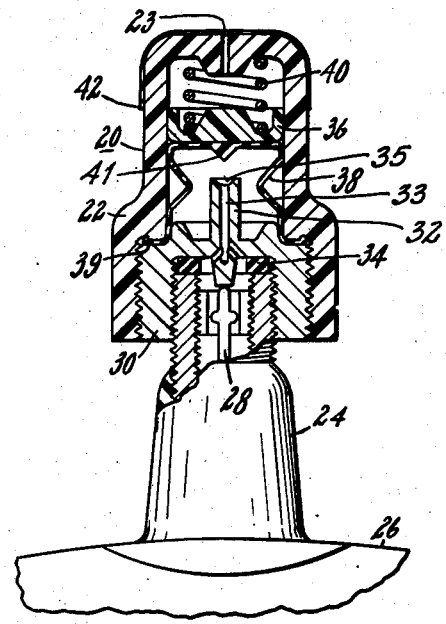
Fig. 1 is a view in cross section of one embodiment of the invention.
Figure 5:
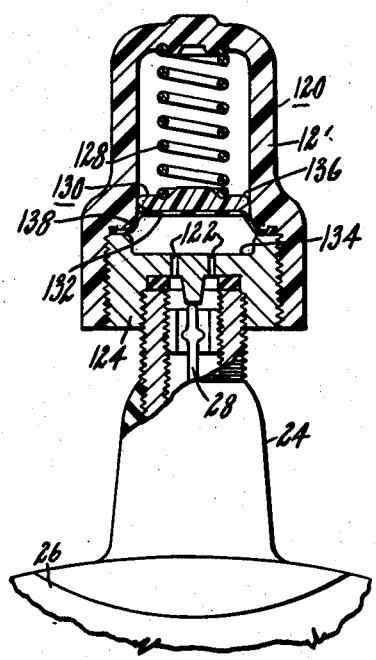

Fig. 5 in cross section shows another modification of the device shown in Fig. 1.

Figure 6:
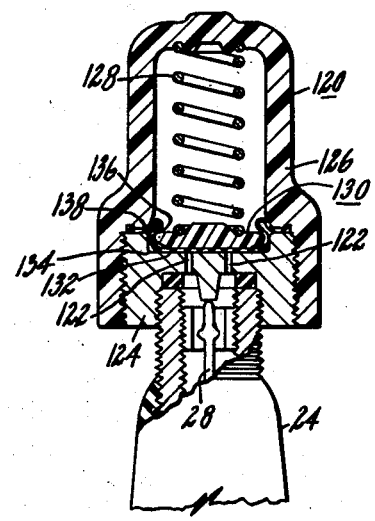

Fig. 6 is a view similar to that shown in Fig. 5 with the device in an indicating position.

Figure 7:
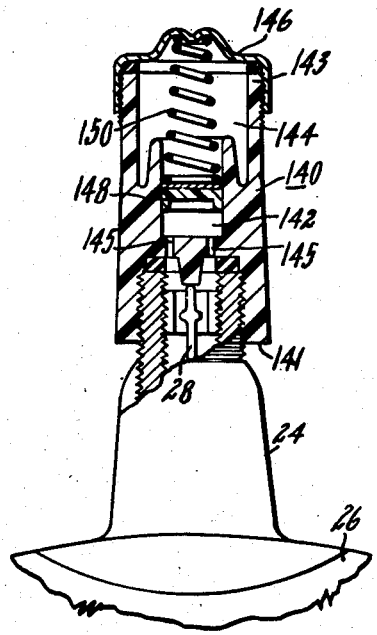

Fig. 7 is another modification of the device shown in Fig. 1.

Figure 8:
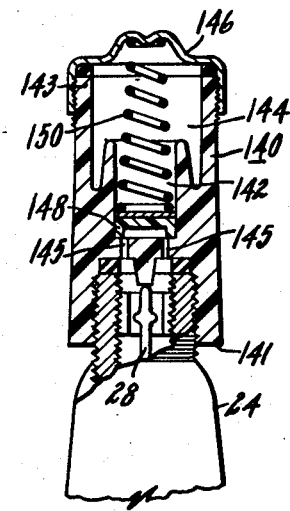

Fig. 8 is a view similar to that shown in Fig. 7 wherein the device is in an indicating position.

Figure 2:
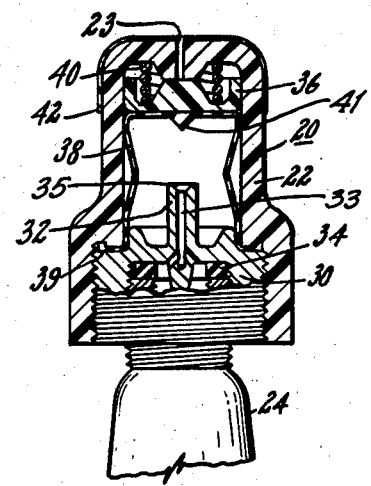
Fig. 2 is a view similar to that shown in Fig. 1 with the device in indicating position.

In the embodiment of the invention shown in Figures 1 and 2 the numeral 20 represents a valve cap adapted to be attached to a valve stem 24 of a pneumatic tire 26. The cap 20 has a transparent case 22, which is sealingly attached to a valve stem 24 through a threaded bushing 30 seated against a gasket 34 on stem 24. The bushing 30 is preferably formed of brass and is threadedly engaged with the valve stem. A valve depressing means 32 integral with bushing 30, is provided to constantly maintain valve 28 in an inseated position when device 20 is applied so the pressure in tire 26 may be communicated to device 20 through an axial passage 33 in valve depressing means 22. An annular seat portion 35 is provided as an enlargement to the end of passage 33 most remote from valve 28. This seat portion 35, in a manner hereinafter to be disclosed, cooperates with a plug 41 to seal off passage 33 in the event pressures in portions of device 20 are unequal to the pressure within tire 26 and thereby prevents deflation of the tire in event of failure of the device.

An indicating means 36 acts as a movable partition within the transparent case 22. This indicating means 36, preferably formed of some suitable colored plastic material, is movable in response to the action of an elastomeric pressure responsive means or bellows 38 interposed between valve 28 and the indicating means 36. The bellows 38 has edges 39 suitably attached to the casing 22 and one surface of its central portion in contact with indicating means 36 so as to bias the same in one direction when pressure is present. The heretofore mentioned plug 41 is formed on the under surface of the bellows 38. The plug 41 is shaped and positioned on bellows 38 so as to sealingly engage an annular seat 35 in event bellows 38 fails to provide a seal for the pressure in the device.

A calibrated spring 40 having one end positioned on an internal surface of casing 22 and the other end in contact with a surface of the indicating means 36 biases the indicating means 36 in opposition to pressure applied by the pressure in bellows 38. The spring 40 may be calibrated to predetermined pressures, i. e. 22, 25 or 28 p. s. i. A pressure relief hole 23 may be included or omitted in the casing 22 and when present will increase responsiveness of the device. An opaque cap 42 may be used on casing 22 if desired.

The operation of the pressure indicating device is as follows: When the pressure within the tire reaches a predetermined value, the pressure responsive means 38 forces indicating means 36 against the calibrated spring 40. When a predetermined pressure has been accumulated within the tire, the indicating means will be obscured from view by the opaque cap 42 located on the transparent casing 22. On the other hand when the tire is running at too low a pressure the means 36 will be visible. The use of color in the indicating means 36 will facilitate observation thereof. When the tire is to be inflated, the device 20 may be removed in the manner of a conventional valve cap and the standard valve 28 will be reinstated to an operative position.

Figure 3:
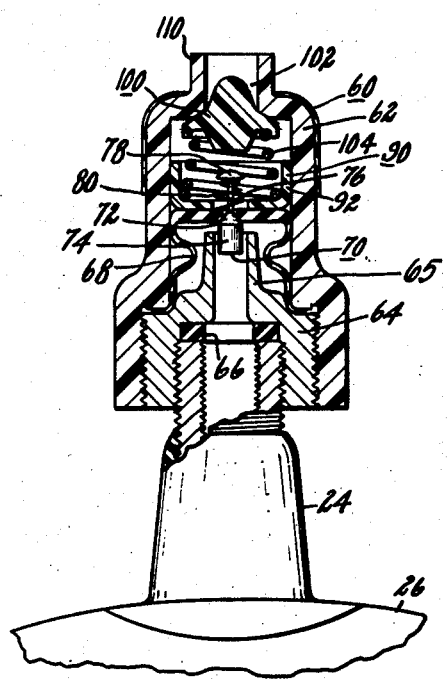
Fig. 3 shows a modification of the device shown in Fig. 1.
Figure 4:
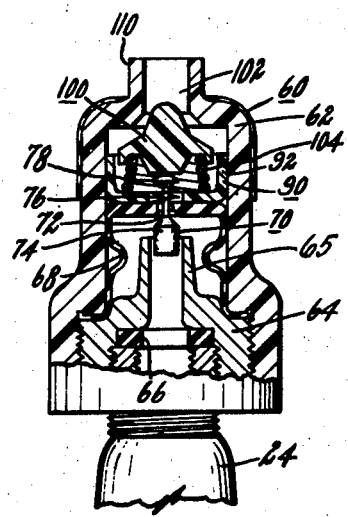
Fig. 4 is a view in cross section of the device in Fig. 3 during inflation of the tire.

Figs. 3 and 4 show a modification of the invention wherein the pneumatic tire 26 may be inflated or deflated without removal of the indicating device 60 from stem 24 of the pneumatic tire 26. This is accomplished by incorporating a valve 70 in the device 60 to take the place of the conventional stem valve 28 as shown in Figs. 1 and 2.

In the present embodiment an indicating valve cap 60 has a transparent case 62 sealingly attached to the stem 24 through a bushing 64 and washer 66 in the manner heretofore described. A valve 70 is positioned in an aperture 72 in pressure responsive means or bellows 68. The aperture 72 serves as a valve seat for a plug 74 and as a guide means for a stem 76 having one end connected to plug 74. A shoulder 78 is provided on the other end of the stem 76 and serves as a seat for a spring 80 which normally maintains plug 74 seated in aperture 72 thereby preventing passage of air through aperture 72 in bellows 68. It is manifest if the bellows is of suitable material such as of relatively soft rubber or alternatively if an annulus (not shown) be provided about aperture 72, that upon the failure of the bellows the greater portion of the air within the tire will be sealed against escape since the bellows will be forced downward by the calibrated spring 80 so the annulus or soft surface of the bellows will engage the top portion of guide means 65 in bushing 64 and thus prevent accidental deflation of the tire.

The indicating means 90 has an elongated rim portion 92 included thereon which is adapted to engage the top wall of the casing 62 when the tire 26 is inflated to a predetermined pressure. The shoulder 78 of stem 76 should be beneath the rim 92 of indicating means 90 when tire 26 has the predetermined pressure therein. This arrangement will permit indicating means 90 to move to its uppermost position without unseating the valve 70.

A dust cap 100 is provided for aperture 102 in casing 62 to prevent dust from entering the interior of the device 60. The cap 100 has an external diameter less than the internal diameter formed within the rim portion 92 of pressure indicating means 90. This arrangement will permit the release of excess air within the pneumatic tire in a manner to be hereinafter described.

The dust cap 100 is normally held in seated position by a spring 104. The other end of spring 104 bears on and biases indicating means 90 in opposition to bellows 68.

An extension 110 may be incorporated on the casing 62 to permit inflation thereof by means of a conventional air hose (not shown). The extension 110 may be integrally formed with the casing and suitably shaped to provide a release for the valve within the conventional air hose. It is also apparent that if the external diameter of the top portion of casing 62 be correctly sized the cap itself may act as a release mechanism for the air hose valve.

Thus it is manifest that when an air hose nozzle is positioned upon device 60 and the valve within the hose nozzle opened, the pressure in the hose will depress cap 100 against the force of spring 104. The air pressure will further unseat valve 70 in bellows 68 and thereby provide an entrance for air into the pneumatic tire 26.

If the tire is to be deflated it may be accomplished by depressing cap 100 sufficiently to engage the shoulder 78 of valve 70.

In Figures 5 and 6 another modification of the device is shown wherein a reference numeral 120 indicates a valve cap adapted to be attached to a valve stem 24 of a pneumatic tire 26 in a manner similar to the attachment of the valve cap 20 in Fig. 1 wherein the cap is attached to suitably depress the tire valve 28 and permit the pressure of the tire to be communicated to the valve cap 120 through passages 122 in a bushing 124 which sealingly connects the valve stem 24 to the transparent case 126. It is to be here noted that the vent hole 23 (Fig. 1) has been omitted in the modification shown (Fig. 5) and the function and arrangement of the calibrated spring 128, the indicating means 130 and the bellows 132 are similar to and correspond to their counterparts as shown and disclosed in Figs. 1 and 2.

The indicating means 130, preferably formed of some brightly colored plastic material, is biased in one direction by calibrated spring 128 acting against one surface thereof and is biased in the other direction by pressure from the tire acting against one surface of the bellows 132 and having the other surface in contact with the other surface of the indicating means. A reduction in elongation of the bellows 132 (Fig. 5) over the bellows 38 (Fig. 1) results in a device more sensitive to pressure changes, thus if the bellows 132 is suitably sized and disposed within casing 126 little if any frictional contact with the sides of the casing 126 will be formed as the bellows 132 responds to the pressure within the tire 26.

In Fig. 5 the bellows 132 is shown as biasing the indicating means 130 to show the proper pressure within tire 26, and in Fig. 6 the bellows 132 is shown within a recess 134 in bushing 124 and covering the rounded peripheral edge 136 of the indicating means 130. This occurs when the bellows assumes an inverted shape due to deflation of the tire. It is manifest that rounding of the corners 138 of casing 126 will decrease frictional contact between the bellows 132 and the internal walls of the casing 126 and will thus increase the sensitivity of the device while correspondingly prolonging its useful life.

A further modification of the invention is shown in Figures 7 and 8 of the drawings wherein a casing 140 has an end 141 attached to a pneumatic tire as has been heretofore discussed. A cylinder 142 formed in an internal portion of casing 140, has one end in communication with the pressure chamber within the tire 26 through bores 145 in end 141 of the casing 140 and the other end opening into a greatly enlarged cavity 144 formed by the casing 140 and cap 146 which is sealingly attached to end 143 of the casing 140. An indicating means 148 acts as a piston within the cylinder 142 and is movable in one direction in response to the pressure acting on one surface thereof from the tire 26 as it is communicated to the cylinder through bore 145 in the casing 140. Acting on another surface of the indicating means 148 and in opposition to said pressure, is a calibrated spring 150 having an end positioned on the cap 146 so as to bias the indicating means in the other direction.

It is apparent that in any of the structures disclosed, the indicating device may be of some suitable material such as metal or organic plastic providing that the material is contrasting to that of the casing so as to be visable therethrough. Obviously in the modification shown in Figures 7 and 8 wherein the indicating means acts as a piston, a relative air seal must be present between the walls of the cylinder and the piston so that the device will be fully responsive to the pressures within the tire. Further the cap 146 as employed with casing 140 may be of some suitable metal or plastic and may be suitably attached to provide a sealed connection.

The device may obviously be attached to the step of a pneumatic tire of either tube or tubeless construction. The material used in the transparent casing is preferably a suitable organic plastic such as methyl methacrylate, poly styrene, etc.

While the embodiment of the present invention constitutes a preferred form, it is to be understood that other forms might be adopted.

What is claimed is as follows:

1. In combination with a pneumatic tire, a pressure indicating device for permanent detachable connection therewith comprising; a sealed pressure chamber having an externally visable wall movable in response to pressure within said tire, an opening between said pneumatic tire and said chamber, a spring opposing movement of said wall whereby the position of said wall indicates a range of pressure within said tire and means associated with said wall for sealing said opening when the pressure within said tire is less than a predetermined value.

2. A pressure indicating device adapted for use with a pneumatic tire comprising in combination a transparent casing normally connected by an opening with a pneumatic chamber within said tire, a pressure indicating means positioned within said casing, a calibrated spring means biasing said indicating means against the pressure in said tire whereby the pressure within the tire can be determined by viewing said means through the casing and a means associated with said pressure responsive means for closing said opening when the pressure within the tire is less than a predetermined value.

3. A pressure indicating device in combination with a pneumatic tire having a stem containing a valve therein comprising: a bushing normally sealingly attached to said stem; a valve depressing means carried by said bushing and adapted to unseat said valve when the bushing is attached to the stem; a casing sealingly attached to said bushing and connected to said stem by an opening in said bushing; a visible pressure indicating means positioned within the casing, an elastomeric pressure responsive means associated with the indicating means through the pressure within the tire and biasing said indicating means in one direction, a calibrated spring within the casing for biasing the indicating means in the opposite direction whereby pressure within the tire can be determined by viewing the indicating means and means associated with said pressure responsive means for closing said opening when the pressure within said tire is less than a predetermined value.

4. A pressure indicating device in combination with a pneumatic tire having a stem leading to a pressure chamber therein comprising: a casing, associated with the stem and having an aperture in a wall portion thereof; pressure indicating means within the casing, a pressure responsive means having one surface exposed through a second opening in said casing to the pressure within the tire and having the other surface in contact with the indicating means, a calibrated spring means having one end biasing the indicating means in one direction whereby the position of the indicating means will indicate a range of pressure in the tire when said pressure biases said indicating means in the other direction; a biased valve means associated with the pressure responsive means, said valve means being adapted to close in response to the pressure in the tire, a cap positioned in said aperture in the casing and biased by the other end of the calibrated spring, whereby entrance of air into the tire is accomplished by unseating the cap and the biased valve in the pressure responsive member and means associated with said pressure responsive means for closing said second opening when the pressure within the tire is less than a predetermined value.

5. A pressure indicating device in combination with a pneumatic tire having a stem leading to a pressure chamber therein comprising; a transparent casing normally assembled with said stem and having a pressure transmitting opening therein, a movable partition within said casing, pressure responsive means biasing the partition in one direction in response to pressure within the tire, a calibrated means biasing the partition in the other direction whereby the location of the partition may be ascertained by viewing the partition through the casing and means associated with said pressure responsive means for closing said opening when the pressure within said tire is less than a predetermined value.

References Cited in the file of this patent

UNITED STATES PATENTS

| | | |
|---|---|---|
| 2,225,674 | West | Dec. 24, 1940 |
| 2,225,675 | West | Dec. 24, 1940 |
| 2,579,120 | Mercer | Dec. 18, 1951 |